May 24, 1938.　　　G. H. KRAFT　　　2,118,252
DRYING WHEY
Filed March 30, 1935　　　3 Sheets-Sheet 3

Inventor
George Howard Kraft
By: Fisher, Clapp,
　　Soans & Pond, Attys.

Patented May 24, 1938

2,118,252

UNITED STATES PATENT OFFICE 2,118,252

DRYING WHEY

George Howard Kraft, Chicago, Ill., assignor to Kraft-Phenix Cheese Corporation, Chicago, Ill., a corporation of Delaware Application March 30, 1935, Serial No. 13,925

10 Claims. (Cl. 99—57)

My invention relates to the drying of whey to produce a non-hygroscopic powder, although it may also be applied to various other materials having analogous properties to which the principles underlying the present invention will be found applicable.

In its most specific application, my invention may be said to constitute an improvement on the method of drying whey described and claimed in Simmons Patent No. 1,763,633, dated June 10, 1930. In accordance with said Simmons patent, whey is evaporated in a vacuum pan until it has reached such a concentration that, upon cooling, the material will "set" to form a semi-solid mass. According to Simmons, said semi-solid whey containing approximately 70 per cent solids and 30 per cent moisture is placed in pans and the drying is completed in a tunnel, whereupon the material is ground, resulting in a whey powder wherein the lactose is in its hydrated, non-hygroscopic condition, as distinguished from hygroscopic whey powders wherein the water of crystallization of the lactose has been driven off.

An object of my invention is to provide an improved method of drying moist, semi-solid whey and like material. Thus, my method diverges from the Simmons method at the point where the semi-solid material is taken from the vacuum pan. The material resulting from my improved process is, like Simmons', a substantially dry, non-hygroscopic whey powder.

My improved process completes the drying of the semi-solid material as it comes from the vacuum pan in an economical and expeditious manner and without any danger of formation of hygroscopic whey powder. My improved process is also advantageous in that it may be operated as a continuous one and is thus capable of high capacity and economy. By my process, the final grinding step required in the Simmons process is obviated.

According to a preferred embodiment, my improved method contemplates intimately admixing with crude or wet semi-solid whey, in the condition in which it comes from the vacuum pan, a substantial quantity of finished or dry non-hygroscopic whey powder, subjecting said mixture in a closed circulating system to the action of a hot drying gas, such as air, separating and cooling the solids while withdrawing the moisture which has been driven off. A portion of the dried solids is withdrawn from the system for bagging, while the remainder is admixed with crude wet material and the cycle repeated. Thus, crude material is continuously being introduced into the system while finished material is being withdrawn.

It is believed that my invention will be more clearly understood from an inspection of the drawings illustrating a preferred mode of operation.

Figure 4 is a top plan view of the same, and

Figure 5 is a sectional view taken substantially along the line 5—5 of Figure 2.

Figure 1:
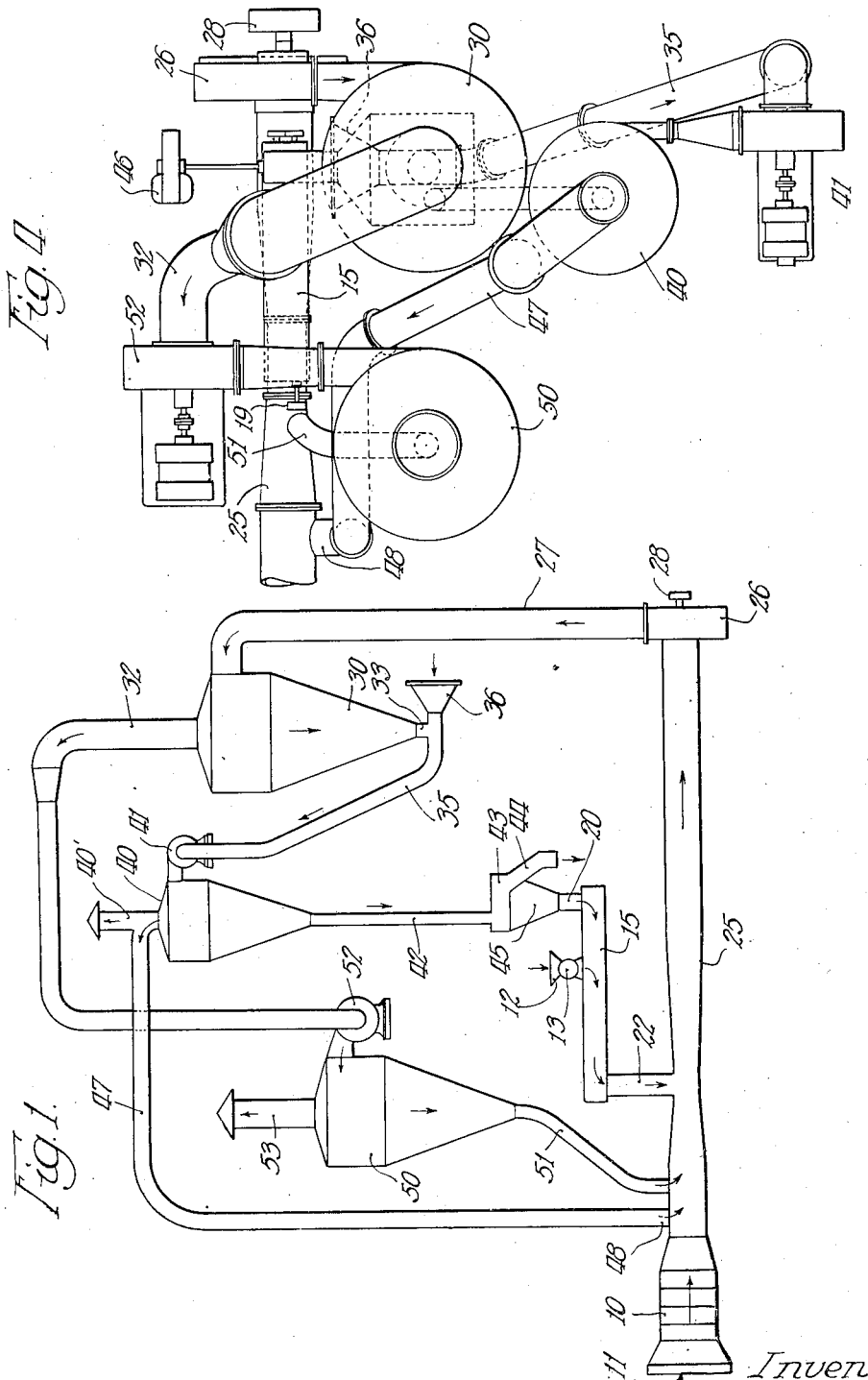
Figure 1 is a simplified elevation illustrating in more or less diagrammatic form a preferred system for practicing my invention.
Figure 2:
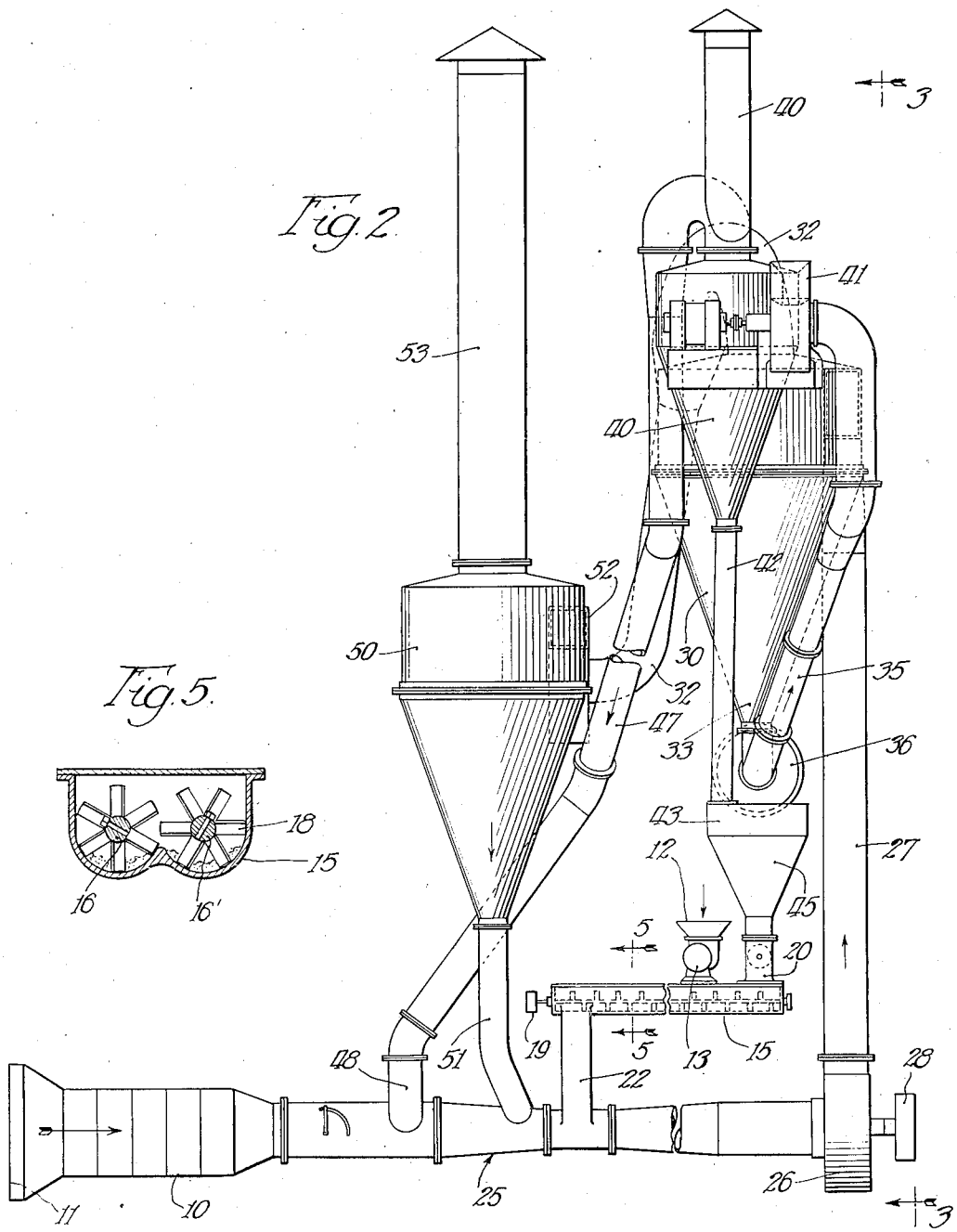
Figure 2 is an elevational view of preferred apparatus for practicing my invention.
Figure 3:
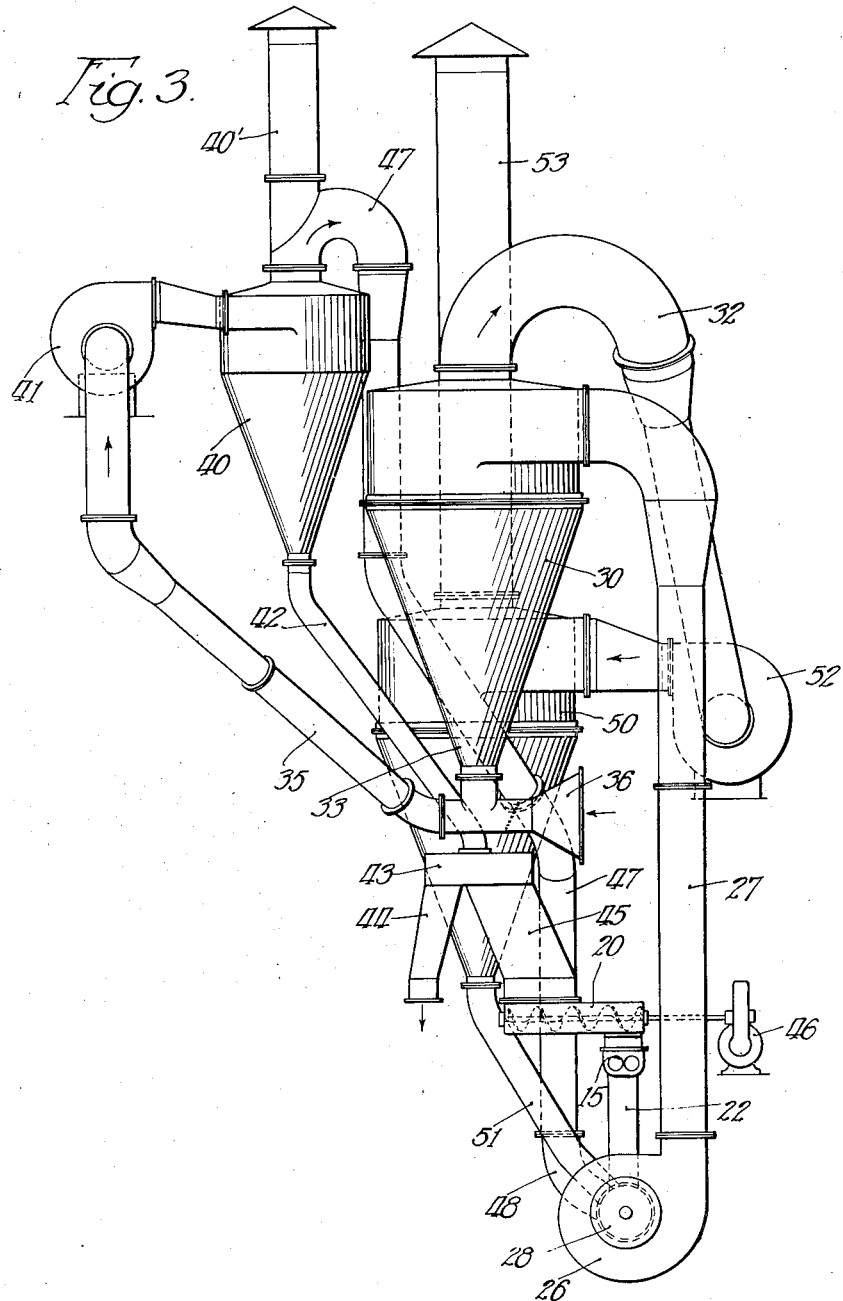
Figure 3 is an elevational view taken from a position indicated by the line 3—3 of Figure 2.

The numeral 10 indicates an air heater of any suitable type, and taking in cold air as at 11. The numeral 12 indicates a hopper of a grinding or comminuted device 13 which communicates with a mixing device 15. The device 15, as seen best in Figures 2 and 5, comprises an elongated enclosed trough in which are journaled a pair of shafts 16 and 16' carrying chopping and propelling blades 18, the shafts 16 and 16' being rotated by any suitable means through a pulley 19.

Communicating with one end of the trough 15 is a worm feed 20 which is designed to introduce finished or dry material, while the chopping device 13 is longitudinally spaced from the discharge point of the feed 20 for introducing crude or wet material, the crude and finished materials being thoroughly admixed by the blades 18 and at the same time propelled toward an outlet conduit 22 which connects the trough 15 with an elongated tubular air tunnel 25.

The tunnel 25 receives air from the heater 10 and communicates with a conduit 27 which in the embodiment shown is vertical, there being interposed between the members 25 and 27 a fan 26 which may be operated by any suitable means through a pulley 28. The conduit 27 discharges into a main collector unit represented at 30, this unit being of any standard or other suitable type and need not be especially described. This unit, in the form now well known on the market, is based upon the principle of directing the material entrained in a current of air in a cyclonic path, suitable baffles usually being provided for separating the solids from the air and other gases, the latter being drawn off from the top as through the conduit 32, while the solids drop to the bottom.

The substantially dry solids are carried off from the discharge portion 33 of the cone 30 by way of a conduit 35, cold air being taken into the system as by way of the enlarged opening 36. Said material entrained in air is carried by the conduit 35 to a collector and cooler 40, another fan preferably being inserted in the line at 41. The collector 40 may be built upon substantially the same principles as the unit 30, and discharges by way of a conduit 42 into a hopper 43. When the system is in normal operation, the fully dried finished powder builds up in the hopper 43 until it overflows through the bagging outlet 44, in accordance with the feed of raw material into inlet hopper 12, the remaining material being discharged through a funnel 45 which discharges into worm conveyor 20. The latter feeds into the mixing device 15, as described above. The conveyor 20, which may be of the usual worm design, may be operated by any suitable means, such as a motor 46.

The concentrator 40 may be provided with an exhaust stack 40′ discharging into the atmosphere and also communicates adjacent the top thereof with an air outlet conduit 47 which leads to the tunnel 25, communicating with the same as at 48.

The gases withdrawn from the top of the collector 30 via conduit 32 are directed into an auxiliary concentrator or save-all 50 which separates any dust or other solid particles that might remain in the air, returning them to the tunnel 25 through a conduit 51. Another fan may be inserted in the system between concentrators 30 and 50, as at 52. Waste gases are carried off from the unit 50 via the vent 53.

A preferred mode of operation of my invention is as follows: Crude or wet material as, for example, whey in a semi-solid condition as it comes from the vacuum pan in accordance with the first part of the Simmons concentrating process, is continuously introduced into the hopper 12. It is comminuted by the chopper 13 and fed into the trough 15. At the same time finished or dry, non-hygroscopic whey powder obtained by my improved process is continuously fed into the mixer 15 through the feed conveyor 20. The ratio of wet and dry material may vary within wide limits, but I have found that my process works satisfactorily when I use one part of crude whey of 30 per cent moisture to 5 to 12 parts of dry whey, by weight.

The crude and dried materials are thoroughly intermixed by the blades in mixer 15 and at the same time are propelled along to the pipe 22 through which the material is fed into the air tunnel 25, where it is picked up and carried along by a current of heated air. I prefer to operate in such a manner that air as it leaves the heater 10 will be at a temperature of approximately 300° F. By the time this hot air will have been mixed with cold air and solids entering at 48, the temperature of said hot air will have been lowered to approximately 220° F.

The subdivided material will be carried along in the current of air through the tunnel 25 and conduit 27. A separation will occur within the unit 30, the solids falling to the bottom while the hot, moist gases will escape at the top through conduit 32. Since cold air is introduced at 36, the solids will be suddenly cooled as they pass from the unit 30 into the conduit 35, still greater cooling taking place as a second separation of solids from gases occurs in the concentrator 40. The solids falling from collector 40 into the conduit 42 will have a temperature of approximately 100 to 110° F. Said solids will pass into the hopper 43, and any desired fraction thereof may be continuously withdrawn for packing, as at 44; in my preferred practice, I may withdraw, at 44, from one-eighth to one-fifteenth of the total flow of solids, although this proportion may vary considerably. Additional moisture will escape from separator 40 via vent 40′.

The remaining dry solids, of course, pass from the hopper 43 via conveyor 20 into the mixer 15 for repetition of the cycle.

Where, as in the case of a whey-concentrate which normally contains about 70 per cent lactose, the non-hygroscopic or crystalline form is desired for the finished material, the repeated cooling is of material advantage in developing or accelerating crystallization, and in preventing the formation of the anhydrous or hygroscopic type of product.

The auxiliary concentrator 50 functions as an economizer or save-all for separating any remaining solids which might pass out of the top of the concentrator 30 with the exhaust gases, water vapor, and other waste gas escaping from this concentrator to the atmosphere by way of vent 53. A further economy is obtained by returning to the system, as at 48, a portion of the heat units contained in the air withdrawn by conduit 47 from the separator 40.

Various modifications and variations coming within the spirit of my invention will doubtless suggest themselves to those skilled in the art. Hence, I do not wish to be limited to the specific embodiments shown or uses mentioned, but intend that the scope of my invention is to be determined from the appended claims, which are to be interpreted as broadly as the state of the art will permit.

I claim as my invention:

1. A method of drying moist semi-solid whey comprising circulating said whey in a current of hot air while agitating the same, and circulating the heated whey in cooling air while agitating the same.

2. A method of drying moist semi-solid whey comprising admixing with said moist whey a substantial quantity of dry whey, circulating the mixture thus obtained in hot air while agitating the same, circulating said mixture in cooling air while agitating the same, and repeating the heating and cooling operations.

3. A method of drying moist semi-solid whey comprising admixing with said moist whey a substantial quantity of dry whey from which most of the moisture has been removed, circulating the mixture thus obtained with hot air while agitating the same, circulating said mixture with a cooling air while agitating the same so as to suddenly cool the whey, and then recirculating the mixture so as to separate the solids from the gases and further cool the whey.

4. A method of drying moist semi-solid whey comprising admixing with said moist whey a substantial quantity of substantially dry powdered whey, circulating the mixture thus obtained in hot air while agitating the same, and circulating said mixture in cooling air while agitating the same.

5. A method of removing water from moist semi-solid whey to form a non-hygroscopic product which when dry contains water of crystallization, comprising repeatedly circulating said moist whey in the presence of hot and cold air accompanied by agitation.

6. A continuous process of drying moist semi-solid partially concentrated whey, comprising admixing the same with substantially dry whey powder, circulating the mixture in a current of hot air, circulating the mixture in cooling air after a substantial proportion of moisture has been removed, continuously withdrawing from the system a substantial proportion of dried material, admixing the remaining dried material with crude moist whey, and repeating the cycle.

7. A method of drying wet semi-solid whey which when dry normally contains water of crystallization and which may be driven off to form a hygroscopic product, said method comprising admixing with the wet whey a substantial proportion of the same material in dry powder form, and repeatedly circulating the mixture in a current of hot and cold air accompanied by agitation to produce a non-hygroscopic powder.

8. A continuous process of drying wet semi-solid whey which when dry normally contains water of crystallization and which may be driven off to form a hygroscopic product, said method comprising admixing with the wet whey a substantial proportion of dry whey powder, circulating the mixture in a current of hot air, circulating the mixture in a cooling air after a substantial proportion of moisture has been removed, continuously withdrawing from the system a substantial proportion of dried whey, continuously admixing the remaining dried whey with the wet whey, and repeating the cycle.

9. The method of preparing dry non-hygroscopic whey powder containing hydrated crystalline lactose, comprising admixing moist semi-solid whey with a substantial proportion of dry non-hygroscopic whey powder, circulating the mixture thus formed in a current of hot air, and circulating said mixture in a current of cooling air.

10. The method of preparing dry non-hygroscopic whey powder containing hydrated crystalline lactose, comprising admixing about 1 part moist semi-solid whey with at least about 5 parts of dry non-hygroscopic whey powder, circulating the mixture thus formed in a current of hot air, and circulating said mixture in a current of cooling air.

GEORGE HOWARD KRAFT.